United States Patent Office 3,361,741

Patented Jan. 2, 1968

3,361,741

OXIDATION OF STARCH SUBSEQUENT TO THE OXIDATION OF DIVALENT LEAD TO TETRAVALENT LEAD WITH OZONE

Garson P. Shulman, Baltimore, Md., assignor to Ashland Oil & Refining Company, a corporation of Kentucky No Drawing. Filed Jan. 6, 1964, Ser. No. 336,064
11 Claims. (Cl. 260—233.3)

This invention relates to the preparation of tetravalent lead from divalent and trivalent lead. More particularly this invention relates to the oxidation of lead dicarboxylates to lead tetracarboxylates using ozone. In addition, this invention particularly relates to the preparation of lead tetraacetate from soluble divalent lead.

Lead tetraacetate is a well known compound which is widely used in organic chemistry as an oxidizing agent. There were three known methods for its preparation. One method was by reaction of red lead oxide ($Pb_3O_4$) with acetic acid. This reaction produces a mixture of lead diacetate and lead tetraacetate. A second procedure was the oxidation of lead diacetate with chlorine to give a mixture of lead dichloride and lead tetraacetate. These two methods have been combined in the generally recommended laboratory procedure for the preparation of lead tetraacetate. The yield by this procedure is, however, inherently limited because of the formation of lead dichloride.

The third method known for the preparation of lead tetraacetate involves electrolysis of lead diacetate in acetic acid to give hydrogen and lead tetraacetate. This procedure, however, is not the most economical method. Commercial procedures utilize the oxidation of lead diacetate by chlorine to give a mixture of lead dichloride and lead tetraacetate. The maximum theoretical yield by that method is 67% due to the formation of about 33% lead dichloride. In addition to the somewhat low yield, there remains a problem in separating lead dichloride from the lead tetraacetate.

It was therefore desirable that an economical method be discovered which would directly yield lead tetraacetate in a relatively pure state.

It is therefore an object of this invention to provide an economical method of direct oxidation of divalent lead to lead tetracarboxylates. It is another object of this invention to provide an economical method of oxidizing divalent lead to tetravalent lead. It is a further object of this invention to provide a catalyst for quantitative yields of lead tetracarboxylates by direct oxidation of divalent lead.

The objects of this invention are accomplished by the process which comprises oxidizing soluble divalent lead with ozone in a carboxylic acid solution in the presence of a soluble salt catalyst to form lead tetracarboxylates.

The present invention provides a method of obtaining quantitative yields of lead tetracarboxylates in an economical manner. This invention is particularly advantageous in that almost no undesirable by-products or contaminants are formed during the reaction. Utilizing an excess of ozone, a complete conversion to lead tetracarboxylates is made.

The sources of lead are soluble divalent lead compositions. The term "soluble" with reference to lead compounds means soluble in a carboxylic acid solution. The preferred soluble lead compositions are lead mono oxide (PbO), red lead oxide ($Pb_3O_4$), lead carbonate ($PbCO_3$), lead acetate, and lead hydroxide ($Pb(OH)_2$). In addition, any other soluble divalent lead can be used. Red lead oxide is the economically preferred soluble lead compound since it includes more oxygen and therefore requires about ⅓ less ozone in the oxidation to lead tetracarboxylate as does lead mono oxide (PbO). The nearly similar price of the two lead oxide materials gives preference to the red lead oxide as a starting material. It is generally known that red lead oxide, $Pb_3O_4$, contains two gram-atoms of divalent lead and one gram-atom of tetravalent lead in one formula weight.

The process of this invention provides a means for preparing lead tetracarboxylates. The carboxylates included are those derived from normally liquid short chain saturated carboxylic acids having chain lengths up to about five carbon atoms. These include acetic, propionic, butyric and valeric acids. The oxidation of divalent or trivalent lead with ozone in the presence of carboxylic acids and sufficient corresponding carboxylic anhydride to absorb the water of reaction, results in the corresponding lead tetracarboxylate. Thus, lead tetraacetate, lead tetrapropionate, lead tetrabutyrate, and lead tetravalerate are prepared from the corresponding carboxylic acid by this procedure.

The most widely used of these compounds is lead tetraacetate. The reaction, using $Pb_3O_4$ (red lead oxide) as the starting material, proceeds in a solution of acetic acid and acetic anhydride as follows:

$$(1)\quad Pb_3O_4 + 8HC_2H_3O_2 \longrightarrow Pb(C_2H_3O_2)_4 + 2Pb(C_2H_3O_2)_2 + 4H_2O$$

$$(2)\quad Pb(C_2H_3O_2)_2 + O_3 + HC_2H_3O_2 \xrightarrow{\text{Catalyst}} Pb(C_2H_3O_2)_4 + O_2$$

The first step in the reaction takes place as in the prior art. The mere dissolving of $Pb_3O_4$ in carboxylic acid solutions causes a partial conversion to lead tetracarboxylate. The same reaction takes place with the other named homologs of acetic acid. The discussion of this invention can be further explained by reference to the formation of lead tetraacetate.

The acetic acid solution preferably contains a portion of acetic anhydride to aid in the removal of water which is formed during the reaction. This addition is not necessary, but preferred to prevent hydrolysis by the water formed during the reaction. The rate of hydrolysis of lead tetraacetate in glacial acetic acid has been found to be slow compared to the rate of its preparation. However, failure to add acetic anhydride markedly affects the yield of lead tetraacetate. It is therefore preferable to add an amount of acetic anhydride sufficient to absorb the water.

The reaction does not take place unless a catalyst is present in the reaction mixture. The catalyst used is a soluble organic or inorganic salt of a metal having an oxidation potential for the transformation of said metal between two oxidation states greater than that required for the conversion of divalent lead to tetravalent lead. In addition, the anion of the salt must be one which is reasonably inert to ozone. The salts of cobalt have been found to be particularly effective. Besides cobalt, bismuth, silver, manganese, and cerium salts have also been found to be effective. The rates of reaction produced by the latter named compounds are either considerably less than that of cobalt salts or the rates of ozone decomposition to oxygen are higher in their presence.

The cobalt salts preferred as catalysts in this reaction are those salts which are soluble in the carboxylic acid solution used. The preferred salts are carboxylates having a chain length of 2 to about 22 carbon atoms, carbonates and hydroxides. The anion used is uimportant provided solubility is obtained. The cation determines the reactivity of the catalyst.

Some of the preferred salts are cobaltous acetate, cobaltous laurate, cobaltous myristate, cobaltous palmitate, cobaltous stearate, cobaltous chloride, cobaltous nitrate, cobaltous carbonate, and cobaltous hydroxide.

The amount of catalyst required is about 0.01% by weight up to about 2.0% by weight. The preferred range is between 0.1% and 1.5% by weight based on the total weight of the reactants.

The reaction temperature greatly effects the rate of reaction. The reaction, however, is operable throughout the liquid range of acetic acid. This means that the reaction can be run in the range of about 16° C. to about 118° C. However, at a temperature above about 80° C., the decomposition of the lead tetraacetate is as rapid as its formation. The preferred reaction temperature range is about 16° C. to about 30° C. At these temperatures, more efficient utilization of ozone is achieved. This apparently is due to the decrease in catalytic decomposition of ozone to oxygen, resulting in a greater portion of ozone being absorbed for oxidation.

At the preferred temperature range, a complete conversion of all divalent lead to tetravalent lead occurs using the catalysts described and an excess of ozone. At higher temperatures than the preferred range, a larger excess of ozone is required to effect a complete conversion to tetravalent carboxylates.

Since ozone is a relatively inexpensive source of active oxygen, a very economical process results in obtaining a complete conversion of divalent lead to lead tetracarboxylates.

Ozone is normally generated and immediately used at the processing site. It is utilized in dilute form in a carrier gas. The concentration of ozone can be varied between about 0.01% to about 15% ozone, the remaining portion being a carrier gas such as oxygen.

The rate of reaction is determined by the amount of ozone being absorbed by the carboxylic acid solution. The amount absorbed is determined by the difference in amount of ozone entering the solution and the amount of ozone passing through the solution. The concentration of ozone in a gaseous stream is measured by bubbling the gas stream through 2% aqueous potassium iodide for a measured time. The aqueous potassium iodide is then acidified and titrated with standardized thiosulfate solution. Using the formula $V \times N \times 24$, where V is the volume of thiosulfate titrated and N is the normality of the thiosulfate solution, ozone is expressed as units per unit time. Ozone as a function of time may be combined with a measurement of flow rate determined by a flow carrier to give the percent composition.

The reaction of this invention is particularly suitable for continuous operation. In a continuous operation procedure, the lead tetracarboxylate is only slightly soluble in the carboxylic acid solution and therefore precipitates. The precipitate is readily removed from the reaction mixture. During the reaction, carboxylic acid is constantly being generated from the water of reaction by reaction with the carboxylic anhydride. Therefore, it is merely necessary to add additional carboxylic anhydride and soluble lead material to continue the reaction. Under continuous operation conditions, it is preferable to maintain about a 5% divalent soluble lead in solution available for reaction at the reaction temperature of about 16° C. to about 30° C. This is readily accomplished by continuously metering into the reaction vessel a saturated solution of carboxylic anhydride and soluble lead. Ozone is continually bubbled through the solution and the precipitating lead tetracarboxylate is continually removed.

The invention will be better understood with reference to the following examples which are illustrations of certain preferred embodiments of the present invention. Unless otherwise indicated, all parts and percentages used herein are by weight.

*Example I*

Lead tetraacetate was prepared from red lead oxide, $Pb_3O_4$, by adding the red lead oxide to a mixture of 55 parts of glacial acetic acid, 37 parts of acetic anhydride and 1.0 part of cobaltous acetate as the catalyst. The solution was placed in a reaction vessel equipped with a stirring means, a gas dispersion means, a thermometer and temperature control unit. The temperature was maintained at 18° C. Upon the addition of 5 parts red lead, lead tetraacetate and lead diacetate was formed. Since lead tetraacetate is only slightly soluble in acetic acid, a precipitate formed. Ozone was then bubbled in finely dispersed form through the solution at a concentration of 6% in an oxygen carrier. The formation of more lead tetraacetate was noted by the increasing amount of precipitate. The precipitate was removed and an additional 5 parts of red lead oxide was added to the solution. Up to about 60 parts of red lead oxide could be added during the reaction without a further addition of acetic anhydride. By using a 40% excess of ozone above the molar equivalent, all of the red lead oxide was converted to lead tetraacetate.

*Example II*

Lead tetraacetate was formed from yellow lead mono oxide, PbO, by adding 25 parts of the lead oxide to a solution of 100 parts of acetic acid and 25 parts of acetic anhydride. The solution was placed in a reaction vessel equipped with a stirring means, a gas dispersion means, a thermometer and temperature control unit. To this solution, 1 part of cobaltous acetate was added. The reaction temperature was maintained at 25° C. A stream of 6% ozone in an oxygen carrier was bubbled in finely dispersed form through the solution. Consumption of ozone was determined by connecting the outlet of the reaction vessel to a potassium iodide trap periodically and titrating the iodide liberated after one minute.

The solid which formed in the reaction vessel was analyzed and found to be lead tetraacetate. An additional small amount of lead tetraacetate crystals were obtained by adding a mixture of benzene and hexane to the filtrate. The lead tetraacetate that remained in the filtrate after the benzene-hexane wash was negligible as determined by iodimetric titration. The yield of lead tetraacetate was 72% per mol of ozone. A 100% conversion to lead tetraacetate was obtained by using an excess of ozone.

*Example III*

Lead tetraacetate was again prepared using yellow lead mono oxide as the source of divalent lead and cobalt chloride as the catalyst. To a mixture of 100 parts of acetic acid and 25 parts of acetic anhydride, 25 parts of lead mono oxide was added. To this solution 0.1 part of cobalt chloride was added. The solution was placed in a reaction vessel equipped with a stirring means, a gas dispersion means, a thermometer, and temperature control unit. The temperature was controlled at 60° C. A stream of 6% ozone in an oxygen carrier was bubbled in finely dispersed form through the reaction mixture. The consumption of ozone was again determined by a potassium iodide trap. The solid precipitate which formed in the reaction vessel was filtered, washed with benzene and dried. An additional small crop of crystals was obtained by adding a mixture of benzene and hexane to the filtrate. The yield of lead tetraacetate was 56% per mol of ozone absorbed. A complete conversion to lead tetraacetate was made by using an excess of ozone.

*Example IV*

A continuous production method for preparing lead tetraacetate was provided by means of a reaction vessel equipped with a metering means for addition of liquid reagents, a filtering means for removal of precipitates, a dispersion means for producing finely divided gaseous bubbles within the reaction mixture and a means of agitating the reaction mixture. The continuous operation was commenced by filling the reaction vessel to the mid-point with glacial acetic acid. A slurry of red lead oxide, $Pb_3O_4$, in acetic anhydride was placed in the lquid metering means. To the acetic acid, 2% cobaltous acetate was added as the catalyst. The temperature of the reaction vessel was maintained at 20° C. Lead tetraacetate was prepared by agitating the solution and slowly metering the saturated red lead oxide slurry into the reaction vessel while bubbling ozone at a 6% concentration in an oxygen carrier through the reaction solution. The lead tetraacetate, formed a precipitate, was removed through the filtering means which returned the filtrate to the reaction vessel.

With acetic acid being generated by the reaction of the water formed with the acetic anhydride present, this acetic acid replenishes the acetic acid used in the formation of the lead tetraacetate.

By using a ratio of about 2 parts of glacial acetic acid to 1 part of acetic anhydride to about 2 parts of red lead oxide, the reaction can be sustained for extended periods of time without upsetting the reaction equilibrium.

The reaction rate is limited by the rate of absorption of ozone by the solution. It was therefore necessary to regulate the flow rate of the red lead oxide slurry so as to correspond to the adsorption of ozone in the reaction medium.

The preparation of lead tetraacetate by the continuous processing method requires an excess of about 20 to 30% ozone in excess of the molar equivalent to accomplish a complete conversion of all of the red lead oxide to lead tetraacetate in a single pass through the reactor.

*Example V*

Lead tetrapropionate was formed from yellow lead oxide, PbO, by adding 10 parts of lead mono oxide to a solution of 100 parts of propionic acid and 25 parts of propionic anhydride. To this solution, 1.0 part of cobaltous acetate was added. The solution was placed in a reaction vessel equipped with a stirring means, a gas dispersion means, a thermometer, and a temperature control unit. The temperature was controlled at 25° C. A stream of 8% ozone in an oxygen carrier was bubbled in finely dispersed form through the reaction mixture. The consumption of ozone was determined by a potassium iodide trap. The solid precipitate which formed in the reaction vessel was filtered, washed with benzene and dried. An additional small crop of crystals was obtained by adding a mixture of benzene and hexane to the filtrate. Analytical analysis determined that the precipitate formed was lead tetrapropionate. A complete conversion of the lead mono oxide to lead tetrapropionate required about 40% excess ozone above the molar equivalent.

*Example VI*

This example indicates the less preferred method of preparing lead tetraacetate without the addition of acetic anhydride.

To a mixture of 100 parts of acetic acid, 25 parts of lead mono oxide was added. To this solution, 1.0 part of cobaltous acetate was added. The solution was placed in a reaction vessel equipped with a stirring means, a gas dispersion means, a thermometer, and a temperature control unit. The temperature was controlled at 25° C. A stream of 6% ozone in an oxygen carrier was bubbled in finely dispersed form through the reaction mixture. The consumption of ozone was determined by a potassium iodide trap. It was determined that a yield of 30% lead tetraacetate per molar equivalent of ozone was obtained. This yield was considerably less than that obtained when the reaction solution contained acetic anhydride.

Lead tetracarboxylates, especially lead tetraacetates, are used primarily as oxidizing agents in organic reactions. One use is as an oxidizing agent for the oxidation of starches to form improved paper sizings. The reaction can be carried out by in situ formation of lead tetraacetate and subsequent oxidation of starch by the lead tetraacetate formed. Starches are normally obtained from corn, sorghum, potato, rice, and the like.

The oxidation of divalent lead proceeds as previously disclosed herein. The oxidation of starch proceeds by the equation:

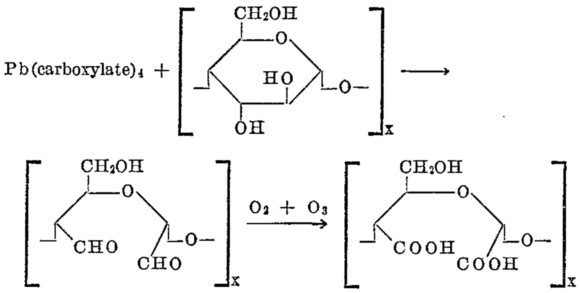

where X is between about 100 and 2000. As shown by the equation, the lead tetraacetate oxidizes the hydroxyl groups to form carboxaldehyde groups, which react very rapidly with ozonized oxygen to form carboxyl groups.

*Example VII*

This example illustrates the in situ formation of lead tetraacetate and the subsequent oxidation of sorghum starch.

A solution of 5 parts of lead mono oxide, PbO, 0.1 part of cobaltous acetate, 25 parts of acetic anhydride and 100 parts of glacial acetic acid was added to 18 parts of sorghum starch. The resulting slurry was placed in a reaction vessel equipped with a stirring means, a gas dispersion means, a thermometer, and temperature control unit. The temperature was controlled at 25° C. While agitating the slurry, ozone was passed through the reaction mixture at a concentration of 6% in an oxygen carrier. The amount of ozone being absorbed by the slurry was determined by a potassium iodide trap.

The ozonization reaction proceeds first to oxidize the divalent lead in acetic acid solution to lead tetraacetate. Continued ozonization in the presence of lead tetraacetate caused the reaction to proceed by the equation:

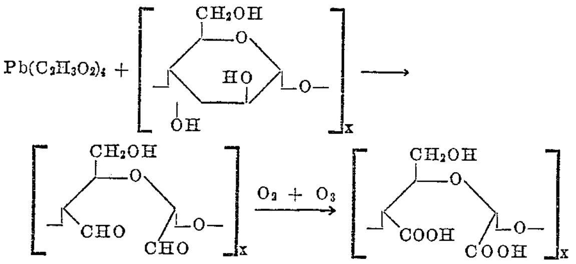

where $x$ is between about 100 and 2000.

When 3.6 parts of ozone had been absorbed by the slurry the reaction was terminated. The solid phase was filtered, washed with benzene, and dried. The product had an acid value of 69.5 indicating the presence of about two carboxylic acids per 9 glucose units. The resulting product was particularly useful as a paper size.

The specific embodiments in which an exclusive property or privilege is claimed are defined as follows:

1. A process for the preparation of lead tetracarboxylate comprising oxidizing a solution of lead compounds in a normally liquid saturated carboxylic acid having 1 to 5 carbon atoms with ozone at a temperature below the boiling point of said carboxylic acid and below the decomposition temperature of said lead tetracarboxylate in the presence of a metal salt catalyst soluble in said carboxylic acid the anion of said salt catalyst being inert with respect to said ozone and the cation of said salt having an oxidation potential greater than that of divalent or trivalent lead to tetravalent lead.

2. A process for the preparation of tetravalent lead comprising oxidizing with ozone, lead compounds dissolved in a short chain saturated carboxylic acid having 1 to 5 carbons in the presence of a metal salt catalyst soluble in said carboxylic acid and inert to said ozone and having a cation selected from the group consisting of cobalt, bismuth, silver, manganese and cerium, said oxidation being carried out at a temperature below the boiling point of said carboxylic acid and below the decomposition temperature of the resulting lead tetracarboxylate.

3. A process for the preparation of lead tetraacetate comprising oxidizing soluble lead compounds with ozone while in solution with acetic acid and acetic anhydride in the presence of a metal salt catalyst soluble in said acetic acid and inert to said ozone and having cation selected from the group consisting of cobalt, bismuth, silver, manganese and cerium, at a temperature below the boiling point of said acetic acid and below the decomposition temperature of said lead tetraacetate.

4. A process for the preparation of lead tetraacetate comprising oxidizing soluble lead compounds with ozone while in solution with acetic acid in the presence of a metal salt catalyst soluble in said acetic acid and inert to said ozone and having a cation selected from the group consisting of cobalt, bismuth, silver, manganese and cerium, said oxidation being carried out at a temperature below the boiling point of said acetic acid and below the decomposition temperature of said lead tetraacetate.

5. A process for the preparation of lead tetraacetate comprising dissolving lead oxide in a solution of acetic acid and acetic anhydride, oxidizing with ozone at a temperature of about 16° C. to about 30° C. in the presence of about 0.01% to about 2.0% cobaltous carboxylate.

6. A process for the preparation of lead tetrapropionate comprising dissolving lead oxide in a solution of propionic acid and propionic anhydride, oxidizing with ozone at a temperature less than about 30° C. in the presence of about 0.01% to about 2.0% cobaltous carboxylate.

7. A process for the preparation of lead tetrabutyrate comprising dissolving lead oxide in a solution of butyric acid and butyric anhydride, oxidizing with ozone at a temperature less than about 30° C. in the presence of about 0.01% to about 2.0% cobaltous carboxylate.

8. A process for the preparation of lead tetravalerate comprising dissolving lead oxide in a solution of valeric acid and valeric anhydride, oxidizing with ozone at a temperature less than about 30° C. in the presence of about 0.01% to about 2.0% cobaltous carboxylate.

9. A process for the preparation of lead tetraacetate comprising continuously adding of a slurry of lead oxide in acetic anhydride to acetic acid containing 0.1 to about 4.0% cobaltous salt at a temperature of about 16° C. to about 30° C., bubbling ozone through the acetic acid during the addition and continuously withdrawing the precipitate formed.

10. A process for the oxidation of starch in a slurry of starch, saturated carboxylic acid having 1 to 5 carbon atoms, soluble lead compound and a soluble metal salt catalyst the anion of said salt catalyst being inert to ozone and the cation of said salt having an oxidation potential greater than that of divalent or trivalent lead to tetravalent lead comprising passing ozone through the slurry, oxidizing the divalent or trivalent lead to tetravalent lead at a temperature below the boiling point of said carboxylic acid and below the decomposition temperature of the resulting lead tetracarboxylate and subsequently oxidizing the starch.

11. A process for the oxidation of starch comprising a slurry of starch, acetic acid, acetic anhydride, soluble lead compound, and a soluble metal salt catalyst inert to ozone and having a cation selected from the group consisting of cobalt, bismuth, silver, manganese and cerium comprising passing ozone through the slurry, oxidizing the divalent lead to tetravalent lead at a temperature below the boiling point of acetic acid and below the decomposition temperature of the resulting lead tetraacetate and subsequently oxidizing the starch.

References Cited

UNITED STATES PATENTS

| | | | |
|---|---|---|---|
| 2,959,605 | 11/1960 | Kebrich | 260—436 |
| 3,072,693 | 1/1963 | Szczepanek et al. | 260—435 |
| 2,989,521 | 6/1961 | Senti et al. | 260—233.3 |
| 3,037,018 | 5/1962 | Gugliemelli et al. | 260—233.3 |

OTHER REFERENCES

Nature, vol. 162, pp. 927–28 (1948), "Red Lead as a Selective Oxidant."

Radley, J. A.: "The Oxidation of Starch," Manufacturing Chemist and Manufacturing Perfumer, July 1942.

DONALD E. CZAJA, *Primary Examiner.*

T. E. LEVOW, *Examiner.*

E. C. BARTLETT, R. W. MULCAHY, *Assistant Examiners.*

UNITED STATES PATENT OFFICE

CERTIFICATE OF CORRECTION

Patent No. 3,361,741 January 2, 1968

Garson P. Shulman

It is certified that error appears in the above identified patent and that said Letters Patent are hereby corrected as shown below:

Column 3, line 45, "flow carrier" should read -- flow meter --. Column 4, line 75, "lquid" should read -- liquid --. Column 6, line 6, in the equation, "HO" should read -- OH --; line 43, in the equation, "HO" should read -- OH --.

Signed and sealed this 20th day of January 1970.

(SEAL)

Attest:

Edward M. Fletcher, Jr.

Attesting Officer

WILLIAM E. SCHUYLER, JR.

Commissioner of Patents